(12) United States Patent
Tanaka

(10) Patent No.: US 11,275,545 B2
(45) Date of Patent: Mar. 15, 2022

(54) PRINT SERVER, IMAGE FORMING APPARATUS, METHOD OF CONTROLLING PRINTING OPERATION AND RECORDING MEDIUM

(71) Applicant: Ricoh Company, Ltd., Tokyo (JP)

(72) Inventor: Kensuke Tanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/049,215

(22) PCT Filed: Jun. 27, 2019

(86) PCT No.: PCT/JP2019/025643
§ 371 (c)(1),
(2) Date: Oct. 20, 2020

(87) PCT Pub. No.: WO2020/009000
PCT Pub. Date: Jan. 9, 2020

(65) Prior Publication Data
US 2021/0240422 A1 Aug. 5, 2021

(30) Foreign Application Priority Data

Jul. 3, 2018 (JP) .............................. JP2018-127068

(51) Int. Cl.
*G06F 3/12* (2006.01)
(52) U.S. Cl.
CPC .......... *G06F 3/1262* (2013.01); *G06F 3/1204* (2013.01); *G06F 3/1238* (2013.01); *G06F 3/1267* (2013.01); *G06F 3/1288* (2013.01)
(58) Field of Classification Search
None
See application file for complete search history.

(56) References Cited

U.S. PATENT DOCUMENTS

2006/0158681 A1\* 7/2006 Yorimoto ........... H04N 1/00278
358/1.15
2011/0317215 A1\* 12/2011 Ida ..................... H04N 1/00233
358/1.15
(Continued)

FOREIGN PATENT DOCUMENTS

| JP | 2014-044546 | 3/2014 |
| JP | 2015-060317 | 3/2015 |
| JP | 2015-173363 | 10/2015 |

OTHER PUBLICATIONS

International Search Report and Written Opinion dated Oct. 15, 2019 in PCT/JP2019/025643 filed on Jun. 27, 2019.

*Primary Examiner* — Frantz Bataille
(74) *Attorney, Agent, or Firm* — Xsensus LLP

(57) ABSTRACT

A print server connectable to an information processing apparatus and an image forming apparatus via a network includes a reception unit configured to receive print jobs transmitted from the information processing apparatus via the network; a group information extraction unit configured to extract group names to which users belong, from the print jobs received by the reception unit; a print job accumulation unit configured to accumulate the group names extracted by the group information extraction unit in a job storage in association with the print jobs; in response to receiving a job acquisition request of print job from the image forming apparatus and based on identification information of a specific user who has transmitted the job acquisition request, an identification unit configured to identify a primary group to which the specific user who has transmitted the job acquisition request belongs, and a secondary group set at a specific hierarchy level in a specific hierarchical group structure with respect to the primary group; and a transmission unit configured to transmit a primary print job associated with the primary group, identified by the identification (Continued)

unit, and a secondary print job associated with the secondary group identified by the identification unit, to the image forming apparatus.

9 Claims, 15 Drawing Sheets

(56) References Cited

U.S. PATENT DOCUMENTS

| | | |
|---|---|---|
| 2012/0060122 A1 | 3/2012 | Tanaka |
| 2012/0236355 A1 | 9/2012 | Tanaka |
| 2013/0176594 A1 | 7/2013 | Tanaka |
| 2014/0055809 A1 | 2/2014 | Nishida |
| 2014/0092434 A1 | 4/2014 | Ida et al. |
| 2015/0055162 A1 | 2/2015 | Nakajima |
| 2016/0274946 A1 | 9/2016 | Tanaka |
| 2016/0277607 A1 | 9/2016 | Tanaka |
| 2018/0241945 A1* | 8/2018 | Mimura ................ G06F 9/4418 |

* cited by examiner

FIG. 11

| GROUP NAME BEFORE CHANGE (PREVIOUS GROUP NAME) | GROUP NAME AFTER CHANGE (CURRENT GROUP NAME) |
|---|---|
| HEADQUARTERS (group_1) | DIVISION 1 (group_1) |
| ANNEX OF HEADQUARTERS (group_2) | ANNEX OF DIVISION 1 (group_2) |

[Table 3]

PRINT SERVER, IMAGE FORMING APPARATUS, METHOD OF CONTROLLING PRINTING OPERATION AND RECORDING MEDIUM

TECHNICAL FIELD

This disclosure relates to a print server, an image forming apparatus, a method of controlling a printing operation and a recording medium.

BACKGROUND ART

In conventional printing methods, a user accumulates print jobs in a print server in advance, and inputs user authentication information to log into a multifunctional peripheral (MFP) to print the print jobs, and then the MFP acquires the print jobs associated with the log-in user from the print server. In this configuration, each print job can be printed only when the user logs into the MFP, with which confidentiality of document can be secured. This printing method is referred to as the pull-print method.

In the pull-print method, the user can print the print jobs registered to the print server only by the user himself or herself. However, there is a case that user A (e.g., president) and user B (e.g., secretary) work in the same office, and user B works for user A as an assistance. In this case, user A, who registers a print job, may want user B to print the print job for user A. In this case, a method of delegation printing is applied. As to the delegation printing, user A and user B are associated with each other in the print server in advance, and if authentication of the user B succeeds, the user B can print the job registered by user A.

The delegation printing is further expanded to a group printing, in which execution of print jobs is allowed to any user belonging to the same group, as disclosed in, for example, Japanese Patent Application Laid-Open No. 2014-044546-A. This technology discloses a system used by users belonging to the same group, in which print jobs registered by one user belonging to one group can be shared with another user belonging to the same group.

CITATION LIST

Patent Literature

PTL 1: Japanese Patent Application Laid-Open No. 2014-044546-A

SUMMARY

Technical Problem

However, in the printing methods described above, printing based on a hierarchical structure of groups is difficult to perform. For example, if a group G1 (one group) exists below a group G (another group) and one user belonging to the group G1 (one group) registers a print job and then wants to allow another user belonging to the group G (another group) to perform a printing operation of the registered print job, one user belonging to the group G1 (one group) is required to register the print job for each of the group G1 (one group) and the group G (another group), respectively.

The present invention is devised in view of the above issue, and aims to provide a new and useful print server that can perform a printing operation based on a hierarchical structure of groups.

Solution to Problem

Example embodiments of the present invention include a print server connectable to an information processing apparatus and an image forming apparatus via a network. The print server includes a reception unit configured to receive one or more print jobs transmitted from the information processing apparatus via the network; a group information extraction unit configured to extract one or more group names to which one or more users belong, from the one or more print jobs received by the reception unit; a print job accumulation unit configured to accumulate the one or more group names extracted by the group information extraction unit in a job storage in association with the one or more print jobs; in response to receiving a job acquisition request of print job from the image forming apparatus and based on identification information of a specific user who has transmitted the job acquisition request, an identification unit configured to identify a primary group to which the specific user who has transmitted the job acquisition request belongs, and a secondary group set at a specific hierarchy level in a specific hierarchical group structure with respect to the primary group; and a transmission unit configured to transmit a primary print job associated with the primary group, identified by the identification unit, and a secondary print job associated with the secondary group identified by the identification unit, to the image forming apparatus.

Example embodiments of the present invention include an image forming apparatus connectable to an information processing apparatus via a network. The image forming apparatus include a reception unit configured to receive one or more print jobs transmitted from the information processing apparatus via the network; a group information extraction unit configured to extract one or more group names to which one or more users belong, from the one or more print jobs received by the reception unit; a print job accumulation unit configured to accumulate the one or more group names extracted by the group information extraction unit in a job storage in association with the one or more print jobs; in response to receiving a job acquisition request of print job and based on identification information of a specific user who has input the job acquisition request to the image forming apparatus, an identification unit configured to identify a primary group to which the specific user who has input the job acquisition request belongs, and a secondary group set at a specific hierarchy level in a specific hierarchical group structure with respect to the primary group; an acquisition unit configured to acquire, from the job storage, a primary print job associated with the primary group, identified by the identification unit, and a secondary print job associated with the secondary group identified by the identification unit; and a display unit configured to display the primary print job associated with the primary group and the secondary print job associated with the secondary group on an operation panel collectively or separately.

Example embodiments of the present invention include a non-transitory computer readable recording medium storing one or more instructions that, when executed by one or more processors, cause the one or more processors to perform a method of controlling a printing operation using an image forming apparatus. The method includes receiving one or more print jobs transmitted from an information processing apparatus via a network; extracting one or more group names to which one or more users belong, from the received one or more print jobs; accumulating the extracted one or more group names in a job storage in association with the one or more print jobs; in response to receiving a job acquisition request of print job from the image forming apparatus and based on identification information of a specific user who has input the job acquisition request to the image forming apparatus, identifying a primary group to which the specific user who has input the job acquisition request belongs, and a secondary group set at a specific hierarchy level in a specific hierarchical group structure with respect to the primary group; and transmitting a primary print job associated with the identified primary group and a secondary print job associated with the identified secondary group, to the image forming apparatus.

Example embodiments of the present invention include a method of controlling a printing operation using an image forming apparatus. The method includes receiving one or more print jobs transmitted from an information processing apparatus via a network; extracting one or more group names to which one or more users belong, from the received one or more print jobs; accumulating the extracted one or more group names in a job storage in association with the one or more print jobs; in response to receiving a job acquisition request of print job from the image forming apparatus and based on identification information of a specific user who has input the job acquisition request to the image forming apparatus, identifying a primary group to which the specific user who has input the job acquisition request belongs, and a secondary group set at a specific hierarchy level in a specific hierarchical group structure with respect to the primary group; and transmitting a primary print job associated with the identified primary group and a secondary print job associated with the identified secondary group, to the image forming apparatus.

Advantageous Effects of Invention

According to preferred embodiments of the present invention, a print server that can perform printing based on a hierarchical structure of groups is provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 11 is an example diagram of a group name transfer database (DB).

DESCRIPTION OF EMBODIMENTS

Figure 1:
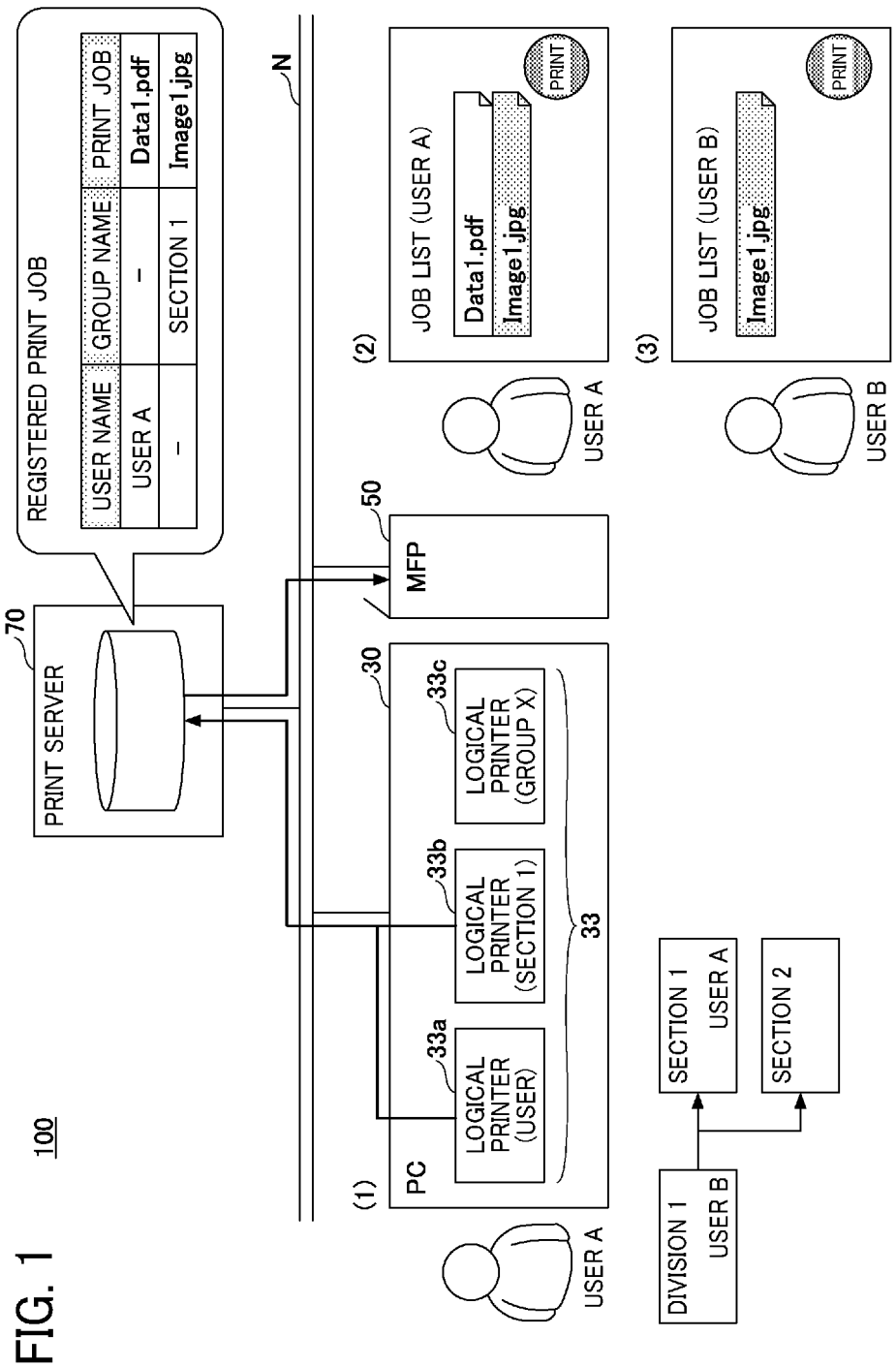
FIG. 1 is an example diagram of a scheme of a printing system according to an embodiment of the present invention, in which a printing operation can be performed based on a hierarchical structure of groups.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Hereinafter, a description is given of a configuration for carrying out the present invention with reference to the drawings.

(Scheme of Operation)

FIG. 1 is an example of a scheme of a printing system 100 according to an embodiment of the present invention, in which a printing operation can be performed based on a hierarchical structure of groups (hereinafter, hierarchical group structure). The configuration of the printing system 100 will be described later in detail. The printing system 100 is compatible not only to general pull-printing but also to a group printing. In the group printing, a print job can be printed by any user belonging to a specific group if each user belongs to the specific group.

When a user is to perform the printing operation, the user registers a print job using one logical printer 33a (or printer driver). Similarly, when the user is to perform the group printing, the user registers a print job using another logical printer 33b or 33c allocated to one or more groups. In the embodiment, as illustrated in FIG. 1, a personal computer (PC) 30 used by one user is installed with a logical printer 33a (i.e., logical printer that can be used for printing by one user alone), and another logical printer allocated to one or more groups, such as logical printers 33b and 33c. In this disclosure, the number of logical printers is not limited to three. In an example case in FIG. 1, the PC 30 is installed with the logical printer 33b allocated to one group (e.g., Section 1) that is associated with user A. Further, the PC 30 is installed with the logical printer 33c allocated to another group (e.g., group X) that is associated with user A.

As to the hierarchical group structure, one group and another group are arranged according to hierarchical orders set for the hierarchical group structure, such that one group is set at a higher level compared to another group, one group is set at a lower level compared to another group, and one group and another group are set at the same level. In an example case in FIG. 1, Section 1 is set at a lower level compared to Division 1, in which Section 1 becomes a subordinate group of Division 1; Division 1 is set at a higher level compared to Section 1, in which Division 1 becomes an upper group of Section 1; and Section 1 and Section 2 are set at the same level, in which Section 1 and Section 2 become the same level groups.

In an example case in FIG. 1, user A belonging to Section 1 (one group) and user B belonging to Division 1 (another group) can perform the following operation indicated in (1) to (3).

(1) User A (first user) registers a print job to the print server 70 from the PC 30 using the logical printer 33a and a print job to the print server 70 from the PC 30 using the logical printer 33b allocated to Section 1. Therefore, the print server 70 is registered with the print job assigned to user A (first user) and the print job assigned to Section 1. In this example case, the first user (user A) uses the information processing apparatus (e.g., PC 30) to transmit the print jobs to the print server 70.

(2) When user A logs in a multifunctional peripheral (MFP) 50, the MFP 50 displays the print job assigned to user A. Further, since the print server 70 confirms that Section 1 is a group to which user A belongs, and then transmits the print job assigned to Section 1 to the MFP 50, the MFP 50 also displays the print job associated with Section 1, which is used as one group name. Therefore, user A can print the print job assigned to Section 1, to which user A belongs, using the MFP 50.

(3) Further, in this example case, even if user B (second user) logs in the MFP 50, a print job assigned to user B is not displayed on a display of the MFP 50 because the print job assigned to user B is not registered in the print server 70. Since Division 1 where user B belongs is an upper or higher group compared to Section 1, the print server 70 can be configured to transmit the print job assigned to Section 1, lower than Division 1, to the MFP 50. In this example case, user B (second user) inputs a job list request or job acquisition request to the MFP 50 used as an image forming apparatus. In this configuration, the MFP 50 displays the print job assigned to one group (Section 1) on the display, with which user B (second user) can print not only a print job assigned to another group (Division 1) where user B (second user) belongs but also the print job assigned to one group (Section 1), which is a subordinate group of another group (Division 1).

As above described, in the printing system 100 according to the embodiment, since the print job is transmitted to the MFP 50 based on the hierarchical structure of groups to which users belongs, if one user belonging to one group registers a print job using a printer driver allocated to another group, another user belonging to another group can print the print job registered by one user belonging to one group depending on the settings of the hierarchical group structure. In an example case in FIG. 1, user B belonging to Division 1 can print the print job assigned to Section 1, which is a subordinate group of Division 1.

If user A (of Section 1) wants to share a print job with user B (of Division 1) using the conventional group printing method, a print job input by user A is required to be associated with Division 1 (i.e., print job is required to be registered for each one of groups).

By contrast, in the embodiment, the workload required for registering the print job can be reduced. In an example case in FIG. 1, in the printing system 100, the print job transmitted to the MFP 50 can be printed by another user (i.e., user other than one user who has registered the print job) belonging to another group higher than one group, but not limited thereto. For example, the print job transmitted to the MFP 50 can be printed by another user belonging to another group lower than one group, and further the print job transmitted to the MFP 50 can be printed by another user belonging to the same level group by setting a given hierarchical group structure for a plurality of groups.

(Terms)

In this description, the first user may indicate a user who registers one or more print jobs, and the second user may indicate a user who performs a printing operation of one or more print jobs registered by some users, such as the first user. In some cases, the same user may become the first user and the second user.

A specific group to which one or more users belong implies that each user is a member belonging to the specific group. Hereinafter, the specific group may also be referred to as an affiliation group. The affiliation group may be determined by organizations, such as companies. In the embodiment, the affiliation group can be identified based on relationships of users and groups registered in a user information database (DB) to be described later. In this description, each user can belong to one or more groups, such that some users belong to one group alone or some users belong to two or more groups depending on the users.

The group is a given unit consisted of a plurality of users. The group can be, for example, a department, a division, and a section of an organization.

The hierarchical group structure indicates relationships among a plurality of groups, defined as stepwise multiple hierarchical layers set for the groups.

(System Configuration)

Figure 2:
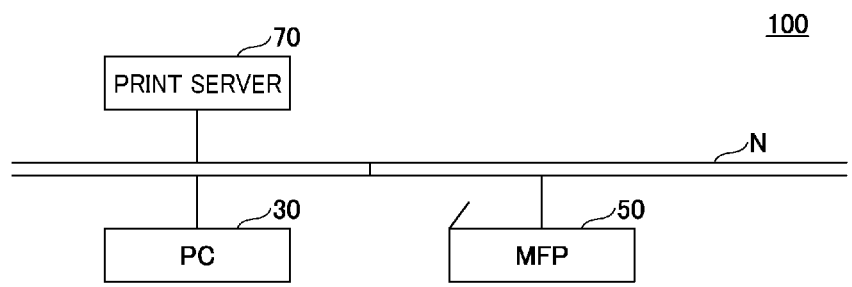
FIG. 2 is an example diagram of a system configuration of the printing system of FIG. 1.

Hereinafter, a description is given of an example of system configuration of the printing system 100 with reference to FIG. 2. FIG. 2 illustrates an example of a system configuration of the printing system 100. The printing system 100 includes, for example, the PC 30, the MFP 50, and the print server 70 each connected to a network N.

The network N is any network, such as local area network (LAN) or the Internet. The LAN is a network configured within a facility, such as an office where the MFP 50 and the PC 30 are located. The network N can include a wide area Ethernet (registered trademark) or wide area network (WAN) configured with a plurality of LANs. The network can be partially or entirely wireless. The wireless network may include wireless LANs, worldwide interoperability for microwave access (WiMAX: registered trademark) and other mobile networks, such as 3G (3rd generation), 4G (4th generation), and 5G (5th generation).

The PC 30 is an information processing apparatus that is operated by a user to register one or more print jobs to the print server 70. The registration of print job may also be referred to as an input of print job in this description. One or more application software programs can be activated and executed on the PC 30, and the PC 30 retains document data generated by executing the one or more application software programs. The printer driver converts the document data into a print job and sends or transmits the converted print data (e.g., print data and print settings described in page description language (PDL)) to the print server 70. Alternatively, if the print server 70 can process the document data that is unconverted, the document data can be transmitted to the print server 70 without conversion. In this description, the print job and the document data will be collectively referred to as the print job without distinguishing the print job and the document data.

In alternative to the PC, any other device may be used as the PC 30, for example, a tablet terminal, a smartphone, a personal digital assistant (PDA), a cellular phone, a wearable computer, or the like. The PC 30 can be any device or apparatus where the printer driver can be operated. Furthermore, the PC 30 can be a teleconference or videoconference terminal, an electronic information board, a projector, a car navigation terminal, a camera, a game machine, or the like.

The print server 70 is a server (an example of information processing apparatus) that controls and provides one or more print jobs using, for example, the pull-print method. The print job includes information, such as print target data and print settings (e.g., the number of copies, colors), and the print job becomes print target information to be subjected to the printing to be performed by the MFP 50. In the embodiment, the print job includes, for example, a name of the logical printer 33 (e.g., name of printer driver or name of printer icon).

Figure 12:
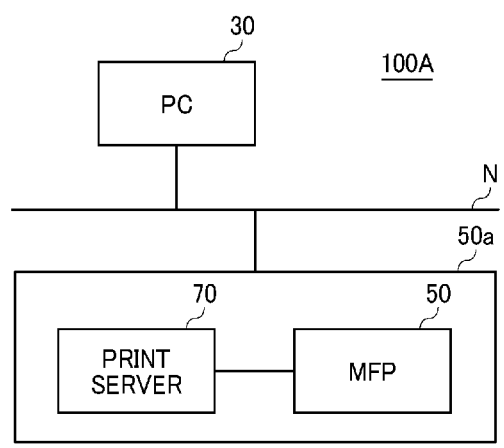
FIG. 12 is an example diagram of another system configuration of the printing system according to the embodiment.
Figure 13:
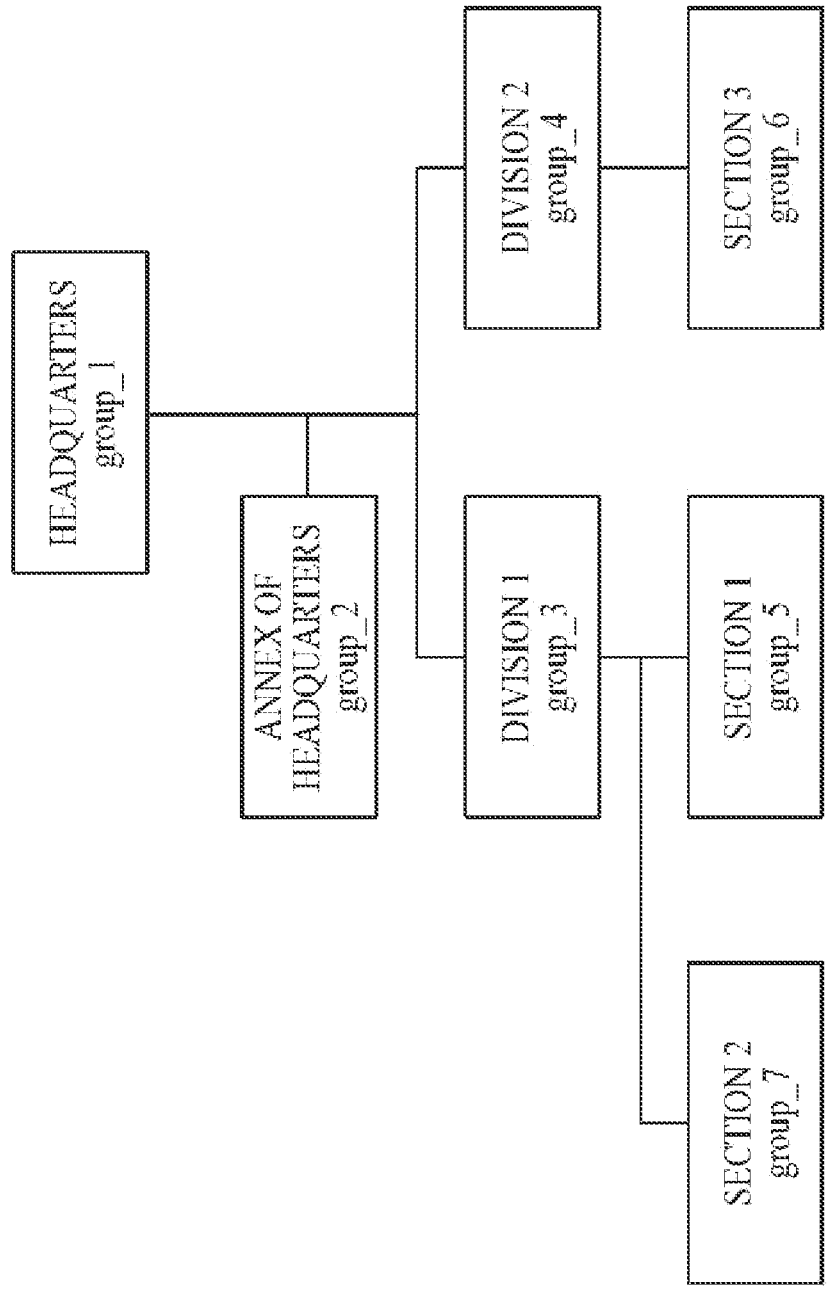
FIG. 13 is an example diagram of group information according to the embodiment.

In the above described configuration, the print server 70 is assumed to have functions of an information processing apparatus. Further, the printing system 100 can be configured without disposing the print server 70 as an independent apparatus. If the print server 70 is not disposed as the independent apparatus in the printing system 100, the MFP 50 can be configured to perform the functions of the print server 70. FIG. 12 illustrates another example of system configuration of the printing system of the embodiment, in which a printing system 100A includes the PC 30 and an MFP 50a, in which the MFP 50a includes the configurations of the print server 70 and the MFP 50 indicated in FIG. 2.

Further, the print server 70 can be an on-premises server or a server provided as cloud service. Further, the print server 70 can have functions other than the printing. Further, the print server 70 can be configured with a plurality of servers. Further, the print server 70 can be configured as virtual server using the so-called virtualization technology.

The MFP 50 is an apparatus having a client function for the print server 70. The MFP 50 is often referred to as a multifunctional apparatus or machine because the MFP 50 has various functions, such as a printer function, a copying function, a facsimile function, a scanner function or the like. Further, the MFP 50 can also be referred to as an image forming apparatus or a printer in view of the printer function. Further, the MFP 50 can also be referred to as a photocopier or a copier in view of the copying function. Further, the MFP 50 can omit some functions, such as the scanner function and the facsimile function, as along as the MFP 50 have a function of performing the printing operation of print job (image forming function).

(Hardware Configuration)

Hereinafter, a description is given of hardware configurations of the print server 70, the PC 30, and the MFP 50 in the printing system 100 according to the embodiment.

(Hardware Configuration of Print Server and PC)

Figure 3:
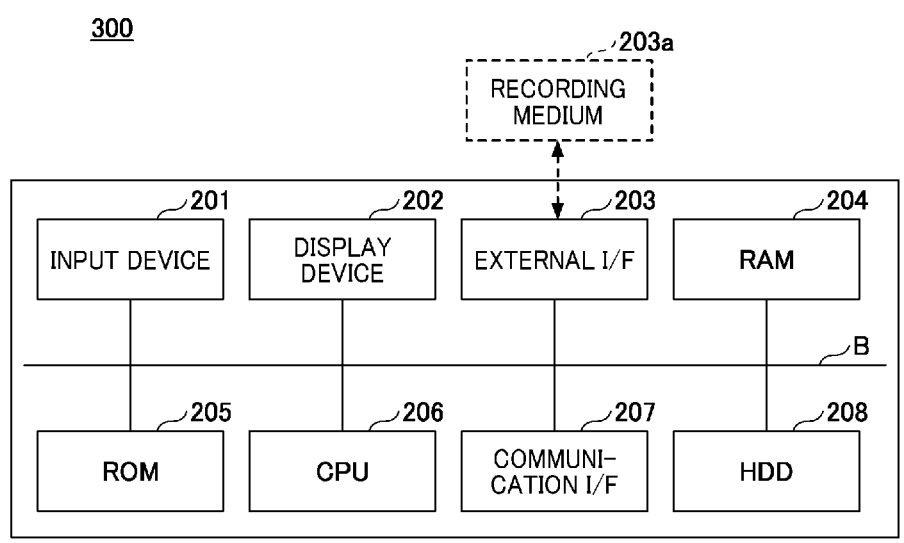
FIG. 3 is an example block diagram of a hardware configuration of a computer system.

The print server 70 and the PC 30 can be implemented, for example, by a computer system employing a hardware configuration illustrated in FIG. 3. FIG. 3 illustrates an example of a hardware block diagram of the computer system 300 according to the embodiment.

As illustrated in FIG. 3, the computer system 300 includes, for example, an input device 201, a display device 202, an external interface (I/F) 203, a random-access memory (RAM) 204, a read only memory (ROM) 205, a central processing unit (CPU) 206, a communication interface (I/F) 207, and a hard disk drive (HDD) 208, connected to one another via a bus B.

The input device 201 includes, for example, a keyboard, a mouse, a touch panel or the like, and is used by a user to input an instruction to generate an operation signal. The display device 202 includes, for example, a display, such as a display panel, that displays results of processing performed by the computer system 300.

The communication I/F 207 is an interface used for connecting the computer system 300 to a network, such as the internal office network and the Internet or the like. With this configuration, the computer system 300 can communicate data via the communication I/F 207.

The HDD 208 is a non-volatile storage device that stores programs and data. The stored programs and data include, for example, operating system (OS), which is the basic software program that controls the computer system 300 entirely, and application software programs, which provide various functions on the operating system. The HDD 208 controls the programs and the data stored in a hard disk (HD) using a given file system and/or database (DB).

The external I/F 203 is an interface connectable to an external device. The external device includes, for example, a recording medium 203a or the like. With this configuration, the computer system 300 can read data from or write data to the recording medium 203a via the external I/F 203. The recording medium 203a employs, for example, a flexible disk, a compact disc (CD), a digital versatile disk (DVD), a secure digital (SD) memory card, a universal serial bus (USB) memory card or the like.

The ROM 205 is a non-volatile semiconductor memory (storage device) capable of retaining programs and data even when the power supply is turned off. The ROM 205 stores the programs and data, such as basic input/output system (BIOS), OS settings, and network settings to be executed when to activate the computer system 300. The RAM 204 is a volatile semiconductor memory (storage device) that temporarily retains programs and data.

The CPU 206 is a computing device that reads programs and data from a storage device, such as the ROM 205 and the HDD 208 onto the RAM 204 and performs various processing to control the computer system 300 entirely and implement functions of the computer system 300.

The print server 70 can be a server compatible to the cloud computing. The cloud computing allows a use of resources disposed on the network without knowing locations where specific hardware resources exist.

(Hardware Configuration of MFP)

Figure 4:
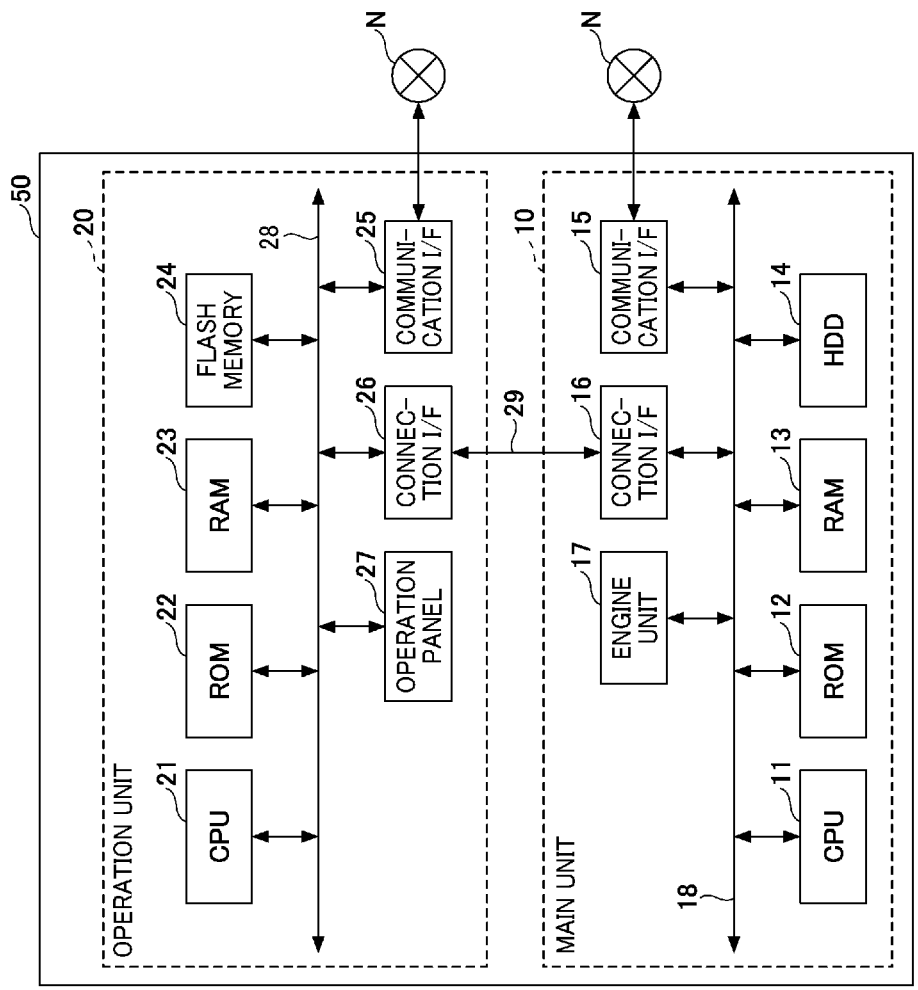
FIG. 4 is an example block diagram of a hardware configuration of a multifunctional peripheral (MFP).

FIG. 4 is an example of a hardware block diagram of the MFP 50. As illustrated in FIG. 4, the MFP includes, for example, a main unit 10 and an operation unit 20. The main unit 10 and the operation unit 20 are connected with each other via a dedicated communication path 29 to communicate with each other. The communication path 29 may be in compatible with a universal serial bus (USB) standard, or any other standard, such as standards for wired communication and/or standards for wireless communication.

Further, the main unit 10 can be operated in accordance with the operation received by the operation unit 20. Further, the main unit 10 can communicate with an external apparatus, such as the PC 30, and can be operated in accordance with an instruction received from the external apparatus.

Hereinafter, a description is given of the hardware configuration of the main unit 10. As illustrated in FIG. 4, the main unit 10 includes, for example, a central processing unit (CPU) 11, a read only memory (ROM) 12, a random access memory (RAM) 13, a hard disk drive (HDD) 14, a communication interface (I/F) 15, a connection interface (I/F) 16, and an engine unit 17, connected to one to another via a system bus 18. For the convenience of description, in FIG. 4, the main unit 10 includes the HDD 14, but the main unit 10 can employ a configuration omitting the HDD 14 (e.g., configuration including a flash memory).

The CPU 11 controls the operation of the main unit 10 entirely. The CPU 11 executes programs stored in the ROM 12 or the HDD 14 using the RAM 13 as a working memory to control the operation of the main unit 10 entirely to implement various functions, such as the copying function, the scanner function, the facsimile function, and the printer function.

The communication I/F 15 is an interface used for connecting with the network N. The connection I/F 16 is an interface used for communicating with the operation unit 20 via the communication path 29.

The engine unit 17 is a hardware resource that performs various processing, other than general information processing and communication processing, to implement various functions, such as the copying function, the scanner function, the facsimile function, and the printer function. For example, the engine unit 17 includes a scanner for scanning an image of document, a plotter (image forming unit) for printing images on sheet material such as paper, a facsimile unit for performing facsimile communication, or the like. Further, the engine unit 17 can include specific options, such as a finisher for sorting printed sheet material, and automatic document feeder (ADF) for automatically feeding document.

Hereinafter, a description is given of the hardware configuration of the operation unit 20. As illustrated in FIG. 4, the operation unit 20 includes, for example, a CPU 21, a ROM 22, a RAM 23, a flash memory 24, a communication interface (I/F) 25, a connection interface (I/F) 26, and an operation panel 27 connected to one to another via a system bus 28. For the convenience of description, in FIG. 4, the operation unit 20 employs a configuration having the flash memory 24, but, for example, the operation unit 20 can employ a configuration omitting the flash memory 24.

As indicated in the configuration illustrated in FIG. 4, the operation unit 20 and the main unit 10 have functions of a computer or information processing apparatus.

(Function)

Figure 5:
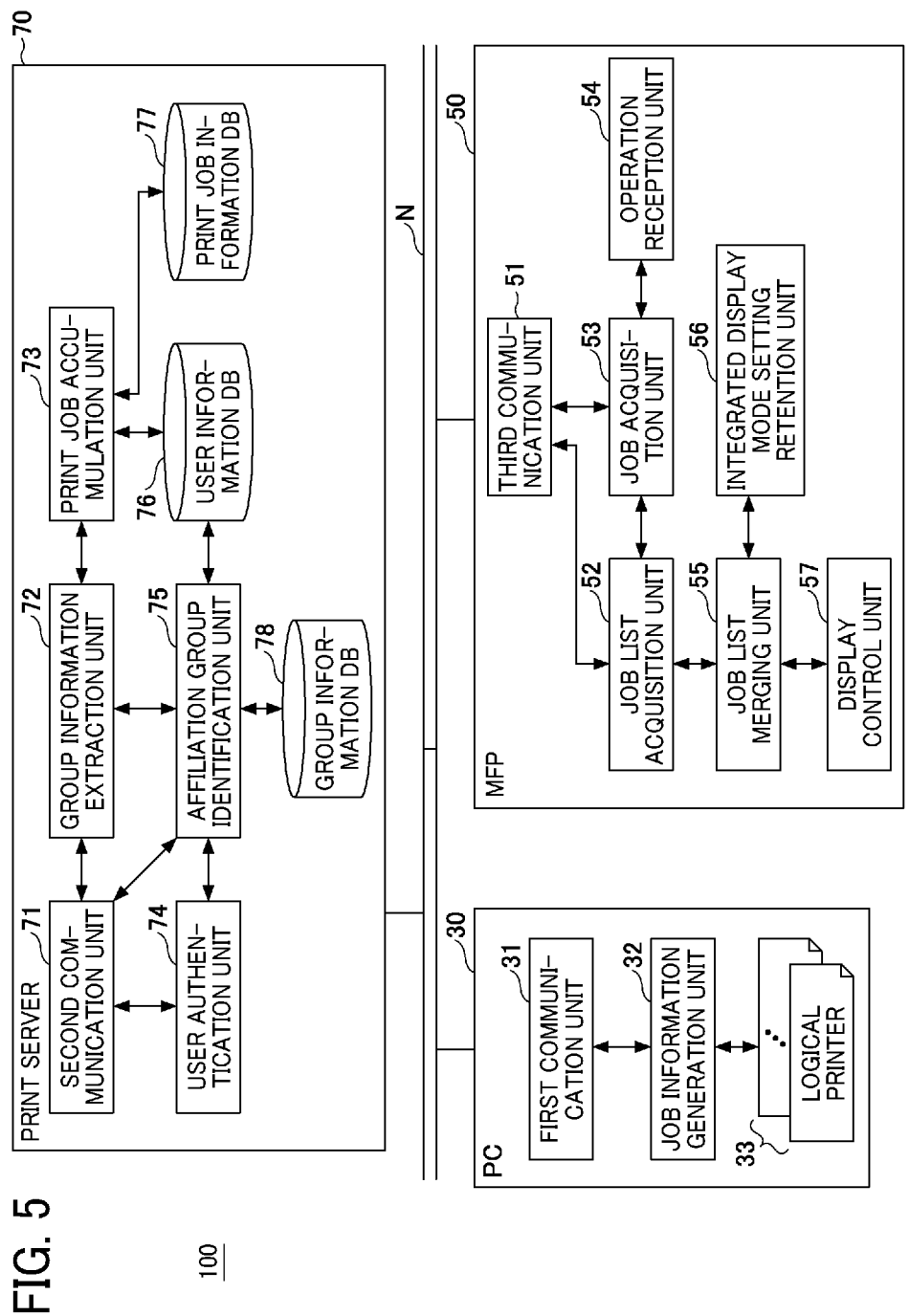
FIG. 5 is an example block diagram of functional configurations of a personal computer (PC), a print server, and an MFP.

Hereinafter, a description is given of functions of the PC 30, the print server 70, and the MFP 50 with reference to FIG. 5. FIG. 5 is an example of functional block diagrams of the PC 30, the print server 70 and the MFP 50.

(Function of PC)

As illustrated in FIG. 5, the PC 30 includes, for example, a first communication unit 31, a job information generation unit 32, and the logical printer 33. Each of the functions of the PC 30 is a function or means implemented by any of the components illustrated in FIG. 3 under the instructions from the CPU 206 executing the programs loaded on the RAM 204 from the HDD 208. The programs can be distributed from a server used for program distribution or distributed in a state stored in a storage medium or carrier medium.

The first communication unit 31 transmits and receives various information to and from the print server 70. In the embodiment, the first communication unit 31 transmits the print job to the print server 70.

The job information generation unit 32 generates a print job in accordance with a printing operation of document input by a user using the printer driver, such as the logical printer 33. The print job includes information, such as print data (e.g., document data) and print settings. In addition to text, such as document, the print data can include low-level image data, such as bitmaps, joint photographic experts group (JPEG), and graphics interchange format (GIF), and higher-level image data, such as enhanced metafile format (EMF), PostScript (registered trademark), and portable document format (PDF) including drawing codes. The print settings indicate information indicating print settings, such as sheet size setting, the number of copies setting, print range setting, single-sided and double-sided printing, reduction/enlargement setting, margin setting, color/monochrome setting, or the like.

The job information generation unit 32 sets, for example, a name of the logical printer 33 in the print job. Further, instead of setting the name of the logical printer 33 in the print job, the name of the logical printer 33 can be attached to the print job. In the embodiment, it is assumed that the name of the logical printer 33 is the same as the name of the printer driver or the name of the printer icon.

The logical printer 33 is used as a logical printer that is associated with information on the MFP 50, and installed on the PC 30. Since a user can recognize the MFP 50 based on a printer icon, for the descriptive purposes, the printer icon can be treated as the logical printer 33. When the printer driver is installed on the PC 30, the logical printer 33 is generated. The logical printer 33 is associated with the MFP 50. In a case of the pull-print method, since the destination of the input print job is the print server 70, the logical printer 33 is associated with the print server 70 using a port (e.g., internet protocol (IP) address, USB port).

Further, the logical printer 33 retains a name of the installed printer driver. Further, a name of the logical printer 33 is displayed as a name of the printer icon. Therefore, based on the name of the logical printer 33, the user can recognize the MFP 50 which can perform the printing operation using the logical printer 33, and/or the print server 70.

The name of the logical printer 33 includes, for example, a model name of the printer that can be used for the printing operation using the printer driver. In the pull-print method, at the time of inputting the print job, it is not yet known which MFP 50 is to be used to print the print job accumulated in the print server 70. Therefore, the printer driver common to various models of the MFP 50 may be preferably used as the printer driver. The printer driver common to various models is a printer driver capable of generating a print job to be printed by utilizing one or more functions common to the MFP 50 even if the models of the MFP 50 are different.

In the embodiment, in addition to the logical printer 33 used for printing by the specific user alone, the logical printer 33 allocated to one or more groups to which the user belongs can be installed. Further, the name of the logical printer 33 includes a group name. The details will be described with reference to FIG. 6.

(Function of Print Server)

As illustrated in FIG. 5, the print server 70 includes, for example, a second communication unit 71, a group information extraction unit 72, a print job accumulation unit 73, a user authentication unit 74, and an affiliation group identification unit 75. Each of the functions of the print server 70 is a function or means implemented by any one of the components illustrated in FIG. 3 under the instructions from the CPU 206 executing programs loaded on the RAM 204 from the HDD 208. The programs can be distributed from a server used for program distribution or distributed in a state stored in a storage medium or carrier medium used as a recording medium.

The print server 70 also includes, a user information database (DB) 76, a print job information database (DB) 77, and a group information database (DB) 78 stored in the HDD 208 and/or the RAM 204 illustrated in FIG. 3. Hereinafter, these information DB are described in detail.

TABLE 1

| USER ID | USER NAME | GROUP ID | GROUP NAME |
|---|---|---|---|
| USER_1 | USER A | group_5 | SECTION 1 |
| USER_2 | USER B | group_6, group_3 | SECTION 3, DIVISION 1 |
| ... | ... | ... | ... |

Table 1 schematically illustrates an example of user information stored in the user information DB 76, which is used as a user information storage. As illustrated in Table 1, the user information DB 76 registers information items, such as user identification (ID), user name, group ID (an example of group identification information), and group name. The user ID is identification information identifying a specific user, or specifying a specific user from among users. The ID stands for identification and means an identifier and identification information. The ID is expressed as a name, code, character string, numerical value, or a combination of one or more of name, code, and character string used for uniquely distinguishing a particular target from a plurality of targets. The user name is a name of a specific user, such as sir name, given name, and nickname. The group name (e.g., Division 1) is a name of a specific group to which one or more users belong, such as department, division, section or the like. The group ID (e.g., group_3) is identification information identifying or specifying a specific group. Further, if one user is associated with a plurality of group names (e.g., two group names), one user is being assigned with roles of the plurality groups (e.g., two groups).

TABLE 2

| JOB ID | USER NAME | GROUP NAME | PRINT JOB |
|---|---|---|---|
| 1 | USER A | | Data1.pdf |
| 2 | USER B | | word1.doc |
| 3 | USER C | SECTION 2 | word2.doc |
| ... | ... | ... | ... |

Table 2 schematically illustrates an example of print job information stored in the print job information DB 77, which is used as a job storage. The print job information DB 77 stores information items, such as job ID, user name, group name, and print job. The job ID is identification information identifying or specifying a specific print job. The user name is a name of a specific user who has input the specific print job. The group name is set only when a print job assigned to the group printing is input. The group name is extracted from the logical printer 33 used by the specific user and then registered. That is, the group name is a name of the specific group to which the specific user belongs. As to be described with reference to FIG. 6, the group name is obtained or acquired from the name of the logical printer 33, such as the name of the printer driver or the printer icon, as described above. The print job indicates a file name of a specific print target.

Table 3 schematically illustrates group information stored in the group information DB 78, which is used as a group information storage. The group information is information for setting a specific hierarchical structure among a plurality of groups. In an example case in Table 3, Division 1 and Division 2 are set as subordinate groups of Headquarters, Section 1 and Section 2 are set as subordinate groups of Division 1, and Section 3 is set as a subordinate group of Division 2. Further, Headquarters is accompanied with Annex of Headquarters. Annex of Headquarters is set as a subordinate group of Headquarters, but is not set as an upper group of Division 1 and Division 2. In this case, print jobs accumulated by users belonging to Division 1 and Division 2 cannot be printed by any user belonging to Annex of Headquarters.

As illustrated in Table 3, the group ID (e.g., group_3) is set for the group name (e.g., Division 1), in which the group name and the group ID are associated with each other.

By referring to the group information DB 78, the print server 70 can identify another group set at a specific hierarchy level in a specific hierarchical group structure with respect to one group to which one user belongs. For example, the print server 70 can identify a subordinate group lower than one group to which one user belongs, and can distribute a print job associated with the group name of the subordinate group to the MFP 50. As described in this specification, the print server 70 can identify another group set at a specific hierarchy level in the specific hierarchical group structure with respect to one group to which the user belongs, in which the identified another group can be at least any one of the subordinate group, upper group, and same level group.

Further, the group information DB 78 can be stored in the print server 70. Further, the group information DB 78 can be stored in an authentication server that performs authentication of users, in which the print server 70 can be configured to acquire a duplication of the group information DB 78 from the authentication server.

(Function of Print Server)

Hereinafter, a description is given of the respective functions of the print server 70. The second communication unit 71 transmits and receives various information to and from the PC 30 or MFP 50. The second communication unit 71 receives a print job from the PC 30 and a job list request or job acquisition request from the MFP 50, and then transmits a job list to the MFP 50. The job list request or job acquisition request is transmitted or input to the MFP 50 by the specific user.

In this description, the specific user who has transmitted or input the job list request or job acquisition request to the MFP 50 is assumed to belong to a group, which is referred to as a primary group, and a secondary group, different from the primary group, is set at a specific hierarchy level in a specific hierarchical group structure with respect to the primary group. For example, the specific user who has transmitted the job list request or job acquisition request to the MFP 50 is one user (e.g., first user) while the specific user who has input the job list request or job acquisition request to the MFP 50 can be another user (e.g., second user), in which different users may be involved. In this description, a print job associated with the primary group is referred to as a primary print job (e.g., first print job), and a print job associated with the secondary group is referred to as a secondary print job (e.g., second print job).

The user authentication unit 74 authenticates a user based on the authentication information of user. For example, the user authentication unit 74 transmits a user ID and a password, transmitted from the PC 30 or MFP 50, to an authentication server, and then obtains an authentication result indicating whether a combination of the user ID and the password is a registered combination from the authentication server. Alternatively, the user authentication determination can be performed at the MFP 50 instead of the print server 70. Further, the authentication information can be any information stored in an ID card or any biometric information of user.

The group information extraction unit 72 extracts a group name included in the name of the logical printer 33 of the print job input from the PC 30, and transmits the extracted group name to the print job accumulation unit 73. The print job accumulation unit 73 adds the group name to the print job and accumulates the group name in the print job information DB 77.

To perform the printing operation, the affiliation group identification unit 75 searches the user information DB 76 for the group name to which the authenticated user belongs. If the group name of the user is identified, the affiliation group identification unit 75 searches the group information DB 78 to acquire a group name of another group, such as a subordinate group lower than one group to which the user belongs. Then, the affiliation group identification unit 75 acquires a print job associated with the group name of one group to which the user belongs and the group name of another group, such as the subordinate group, from the print job information DB 77. In this configuration, the same print job can be associated with the group name of one group to which the user belongs and the group name of another group, and one print job can be associated with the group name of one group to which the user belongs and another print job can be associated with the group name of another group.

As above described, the affiliation group identification unit 75 searches the group information DB 78 to acquire the group name of the subordinate group lower than one group to which the user belongs, but not limited thereto. For example, the affiliation group identification unit 75 can also search the group information DB 78 to acquire a group name of another group (an upper group higher than one group to which the user belongs), and/or a group name of another group (a group at the same level of one group to which the user belongs), and to acquire a print job associated with the group name of the upper group and/or a print job associated with the group name of the same level group.

(Function of MFP)

As illustrated in FIG. 5, the MFP 50 includes, for example, a third communication unit 51, a job list acquisition unit 52, a job acquisition unit 53, an operation reception unit 54, a job list merging unit 55, an integrated display mode setting retention unit 56, and a display control unit 57. Each of the functions of the MFP 50 is a function or means implemented by any one of the components illustrated in FIG. 4 under the instruction from the CPU 11 executing programs loaded on the RAM 13 from the HDD 14. The programs can be distributed from a server used for program distribution or distributed in a state stored in a storage medium or carrier medium used as a recording medium. Further, the operation unit 20 may have some functions.

The third communication unit 51 transmits and receives various information to and from the print server 70. In the embodiment, the third communication unit 51 transmits a job list request or job acquisition request to the print server 70, and then receives a job list from the print server 70.

The operation reception unit 54 receives various operations and inputs performed by the user to the MFP 50. For example, the operation reception unit 54 receives an input of authentication information and a selection of print job performed by the user. The display control unit 57 displays various information on the operation panel. For example, the display control unit 57 displays a print job list on the operation panel.

If the user authentication has succeeded, the job list acquisition unit 52 designates a specific user ID and requests the job list to the print server 70, and acquires a job list from the print server 70. For example, the display control unit 57 sorts print jobs in the order descending from the newest input date and time to display the sorted print jobs on the operation panel.

The integrated display mode setting retention unit 56 retains information indicating whether a display mode is an integrated display mode or not. The integrated display mode is one setting of display mode, in which a user's own print job and a print job assigned to a group to which the user belongs (and further a print job assigned to another group, such as the subordinate group lower than the group to which the user belongs, the upper group higher than the group to which the user belongs, and/or the same level group) are merged and displayed collectively. Hereinafter, for the simplicity of description, the print job assigned to another group is assumed to be the print job assigned to the subordinate group set lower than one group to which one user belongs. However, the another group can be any of the subordinate group, the upper group, and the same level group.

If the display mode is set to the integrated display mode, the job list merging unit 55 merges, for example, the user's own print job with the print job assigned to the group to which the user belongs, and the print job assigned to the subordinate group. The merging means combining two or more data into one data. In this case too, the display control unit 57 sorts print jobs in the order descending from the newest input date and time to display the sorted print jobs on the operation panel.

If the display mode is not the integrated display mode (i.e., display mode is a nonintegrated display mode), the job list merging unit 55 does not perform the merging. In a case of the non-integrated display mode, the display control unit 57 separately displays the user's own print job, the print job assigned to the group to which the user belongs, and the print job assigned to the subordinate group.

The job acquisition unit 53 requests a print job selected from the job list by the user to the print server 70 via the third communication unit 51 to obtain or acquire the print job from the print server 70. Then, the MFP 50 starts to perform a printing operation of the print job.

Figure 6:
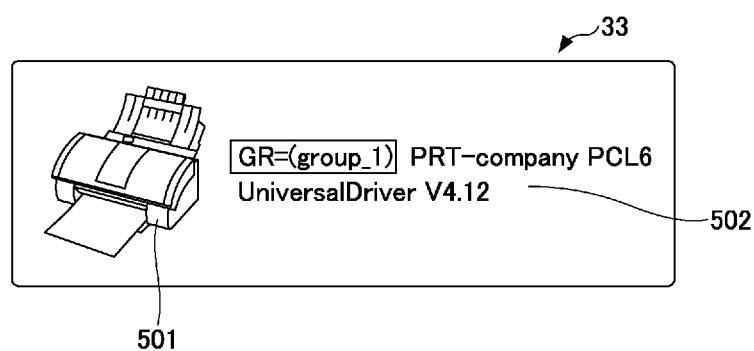
FIG. 6 is an example illustration of a logical printer.

Logical Printer:

FIG. 6 illustrates an example of the logical printer 33. The PC 30 displays, on a display of the PC 30, information of the logical printer 33 of the MFP 50 installed with the printer driver. Further, when a user performs an operation for setting the print settings using the application software, such as the word processing software, the logical printer 33 of the MFP 50 installed with the printer driver is displayed. In this description, the logical printer 33 corresponding to the print server 70, used for registering the print job, is displayed on the display of the PC 30.

In FIG. 6, an icon 501 and a name 502 of the logical printer 33 are displayed as the information of the logical printer 33. The name 502 of the logical printer 33 includes a group name. In an example case in FIG. 6, "GR=(Group 1) PRT-company PCL 6 UniversalDriver V4.12" is displayed for the logical printer 33.

GR=(Group 1): Group name

PRT-company: Manufacturer name (company name) of MFP50

PCL6: Name of PDL (Printer Description Language)

UniversalDriver: Name of printer driver (Universal Drive is common to different models)

V4.12: Version of printer driver

The name 502 of the logical printer 33 is transmitted from the PC 30 to the print server 70 together with the print job. Since the name 502 of the logical printer 33 includes the group name, the group information extraction unit 72 of the print server 70 can extract the group name from the name 502 of the logical printer 33. Specifically, if GR=(xxx) such as "GR=(group name)" exists at the very beginning of the name 502 of the logical printer 33, the group information extraction unit 72 extracts "xxx" in the parentheses and detects as the group name. If the group name can be detected in response to receiving an input of the print job, the print job accumulation unit 73 adds the group name to the print job information DB 77 to accumulate or store the group name.

In this configuration, when the user is to perform the group printing, the user can select the logical printer 33 allocated to each group to which the user belongs, with which the personal printing performed by the user himself or herself and the group printing can be switched easily.

(Operation Procedure)

(Accumulation of Job)

Figure 7:
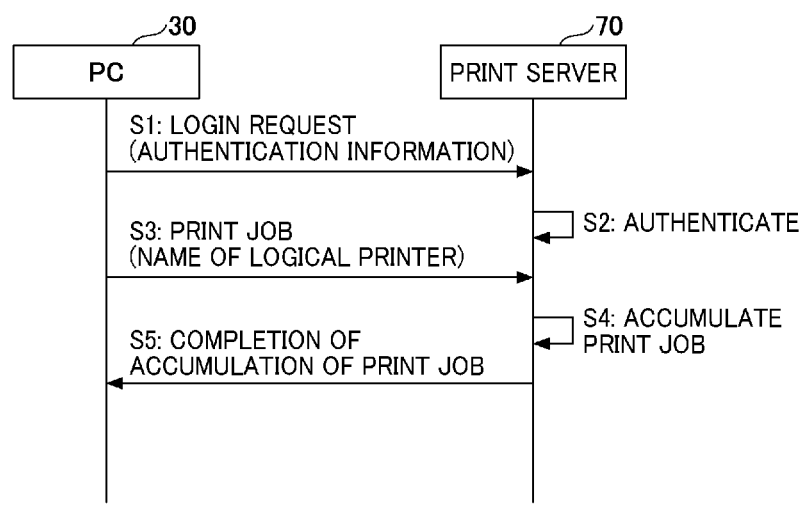
FIG. 7 is an example sequence diagram illustrating a process of accumulating one or more print jobs.

FIG. 7 is an example of a sequence diagram illustrating a process of accumulating one or more print jobs. The sequence of FIG. 7 is performed when a user is to input one or more print jobs.

S1: A user (first user) inputs a login request including authentication information using the PC 30 to log in the print server 70 (i.e., input of authentication information). Then, the operation reception unit 54 of the PC 30 receives the login request including the authentication information, and the first communication unit 31 transmits the login request including the authentication information to the print server 70.

S2: The second communication unit 71 of the print server 70 receives the login request, and then the user authentication unit 74 authenticates the user (first user). In this example case, it is assumed that the user authentication has been successful completed.

S3: Then, the user (first user) selects the logical printer 33 used for inputting a print job into the print server 70, and then instructs to transmit the print job including a name of the logical printer 33 to the print server 70. Specifically, in accordance with an instruction from the first user, the information processing apparatus (e.g., PC 30) transmits the print job to the print server 70. In this stage, the user (first user) can switch the input of print job between the input of user's own print job, the input of a print job assigned to a group to which the user belongs (an example of first group) and the input of a print job assigned to a subordinate group (an example of second group) by selecting the logical printer 33. In this description, the second group can be any of the subordinate group, upper group, and same level group.

S4: The second communication unit 71 of the print server 70 receives the print job, and then the group information extraction unit 72 attempts to extract the group name from the name of the logical printer 33. The details of step S4 will be described later with reference to FIG. 8. In this example case, it is assumed that the print job assigned for the group printing is accumulated in the print job information DB 77.

S5: The second communication unit 71 transmits a notification indicating completion of accumulation of the print job to the PC 30.

Figure 8:
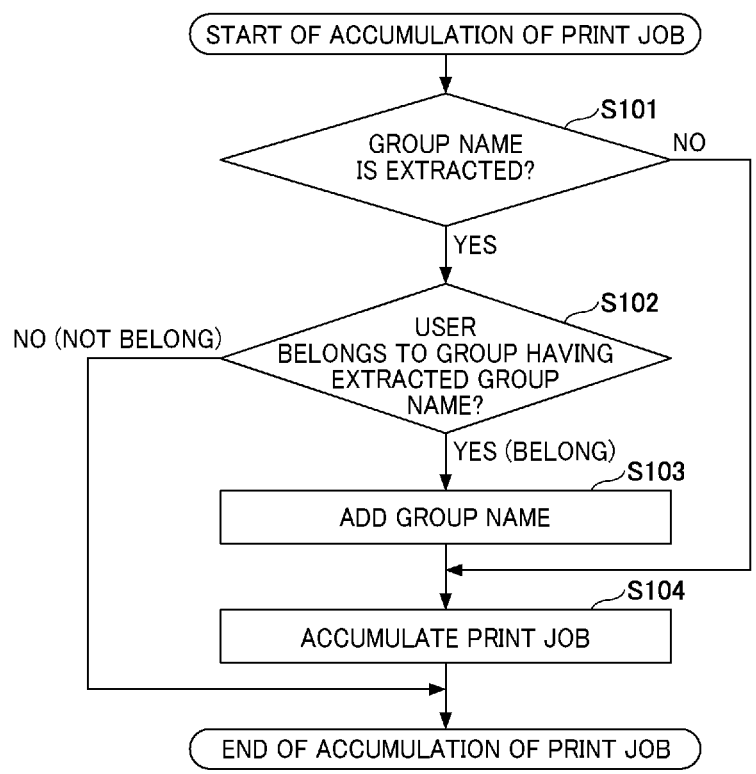
FIG. 8 is an example flowchart illustrating a process of accumulating one or more print jobs.

FIG. 8 is an example of a flowchart illustrating the steps of accumulating one or more print jobs. The sequence of FIG. 8 is performed in step S4 of FIG. 7.

At first, the group information extraction unit 72 determines whether or not the group name can be extracted from the name of the logical printer 33 (step S101). That is, the group information extraction unit 72 determines whether or not there is a character string of "GR=(xxx)" at the very beginning of the name 502 of the logical printer 33.

If the group name cannot be extracted by the group information extraction unit 72 (S101: NO), the sequence proceeds to step S104, in which the print job is accumulated as the user's own print job.

If the group name can be extracted by the group information extraction unit 72 (S101: YES), the group information extraction unit 72 determines whether or not the user belongs to the group having the extracted group name (step S102). That is, the group information extraction unit 72 determines whether the name of the group name obtained by searching the user information DB 76 using the user ID matches the group name extracted from the name of the logical printer 33. With this configuration, the inputting of print job assigned to the group where the user does not belong, can be prevented. For example, erroneous registration of the print job to an unintended group, causing information leakage, can be prevented.

If the determination in step S102 is "NO," the sequence of FIG. 8 ends.

If the determination in step S102 is "YES," the print job accumulation unit 73 adds the group name to the print job (step S103).

In step S104, the print job accumulation unit 73 accumulates the print job in the print job information DB 77 (step S104).

Figure 9:
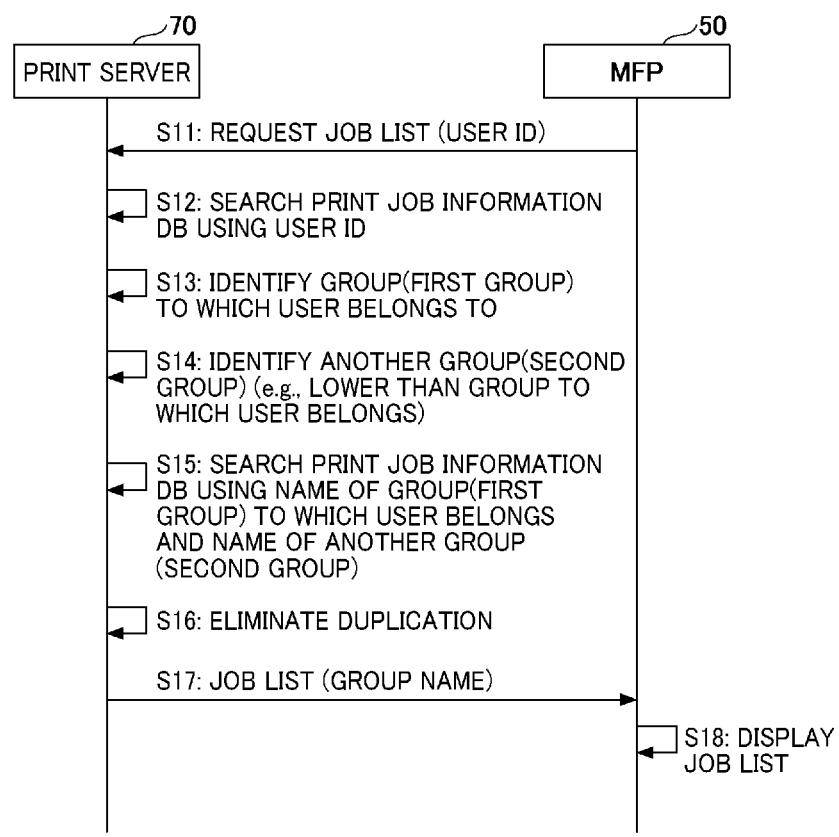
FIG. 9 is an example sequence diagram illustrating processing to execute a print job.

Printing of Print Job:

FIG. 9 is an example sequence diagram illustrating processing to perform execution of a print job. The sequence of FIG. 9 is performed when a user (e.g., second user) instructs to perform the printing operation to execute the print job using the MFP 50.

S11: A user (e.g., second user) inputs an instruction that requests a job list to the MFP 50. Specifically, the second user inputs a job list request or job acquisition request into the MFP 50. When the operation reception unit 54 of the MFP 50 receives the user operation, the job list acquisition unit 52 transmits the job list request or job acquisition request to the print server 70 via the third communication unit 51. In this example case, the user ID is already identified by the authentication processing, or the user ID can be transmitted when transmitting the job list request or job acquisition request.

S12: When the second communication unit 71 of the print server 70 receives the job list request or job acquisition request, the affiliation group identification unit 75 searches the print job information DB 77 using the user ID. With this configuration, the user's own print job can be searched and identified.

S13: Then, the affiliation group identification unit 75 searches the user information DB 76 using the user ID and identifies a group name to which the user belongs. The group name to which the user belongs may be one or more group names depending on each user.

S14: Then, the affiliation group identification unit 75 searches the group information DB 78 for one group to which the user belongs and identifies another group, such as a subordinate group lower than one group.

S15: The affiliation group identification unit 75 searches the print job information DB 77 for one group to which the user belongs and another group, such as the subordinate group.

S16: Since the search results in step S12 and S15 may include the same print job in some cases, the affiliation group identification unit 75 deletes the duplication of the same print job. Specifically, when both the user name and the group name are registered in the print job information DB 77, the same print job is detected in steps S12 and S15 in duplication. In this case, since the group printing can be set with a higher priority, the duplicated print job is deleted from the search result of step S12.

S17: The second communication unit 71 of the print server 70 transmits the job list to the MFP 50. When transmitting the job list, for each of the print jobs, information identifying whether the print job is the user's own print job, the print job assigned to the group to which the user belongs and the subordinate group is attached. For example, in a case that the print job is assigned to the group to which the user belongs and the subordinate group, the group name is attached. Therefore, if the group name is not attached to the print job, the concerned print job indicates the user's own print job, and if the group name is attached to the print job, the concerned print job indicates the print job assigned to the group to which the user belongs and/or the subordinate group. The information identifying the user's own print job, the print job assigned to the group to which the user belongs, and the subordinate group can be used when the integrated display mode is set.

S18: The job list acquisition unit 52 of the MFP 50 acquires the job list via the third communication unit 51, and then the display control unit 57 of the MFP 50 displays the job list on the operation panel.

In an example case in FIG. 9, the print job associated with the group name of the subordinate group, which is lower than the group to which the user belongs, is searched. However, the affiliation group identification unit 75 can search and identify any group set at a specific hierarchy level in a specific hierarchical group structure, instead of the subordinate group which is lower than the group to which the user belongs. For example, the affiliation group identification unit 75 can search and identify another group that is at the same hierarchy level of the group to which the user belongs. As to the group information DB 78 of Table 3, if the group to which the user belongs is Section 1, Section 2 is identified as the same level group in the hierarchical group structure. If the group to which the user belongs is Division 1, Division 2 is identified as the same level group in the hierarchical group structure. The subordinate group is not identified for Section 1 and Section 2. Further, the affiliation group identification unit 75 can search and identify another group that is set at the higher level with respect to the group to which the user belongs in the hierarchical group structure.

(Displaying of Job List)

In this description, if a user who has requested the job list is user A, user A belongs to Section 1 (group_5) based on the user information DB 76 (see Table 1). There are no subordinate groups under Section 1 (group_5). The print job information DB 77 (see Table 2) stores "Data 1.pdf" associated with user A but does not include any print job associated with Section 1 (group_5). Therefore, "Data 1.pdf" is displayed for the job list requested by user A.

If the user who has requested the job list is user B, user B belongs to Section 3 (group_6) and Division 1 (group_3) based on the user information DB 76 (see Table 1). There are no subordinate groups under Section 3 (group_6) while there are subordinate groups of Section 1 (group_5) and Section 2 (group_7) under Division 1 (group_3) as indicated in Table 3.

Further, the print job information DB 77 stores "word1.doc" associated with user B (see Table 2). There are no print jobs associated with Division 1 (group_3) and Section 1 (group_5) while there is "word2.doc" associated with Section 2 (group_7) as indicated in Table 2. Therefore, "word1.doc" and "word2.doc" are displayed for the job list requested by user B.

Figure 10A:
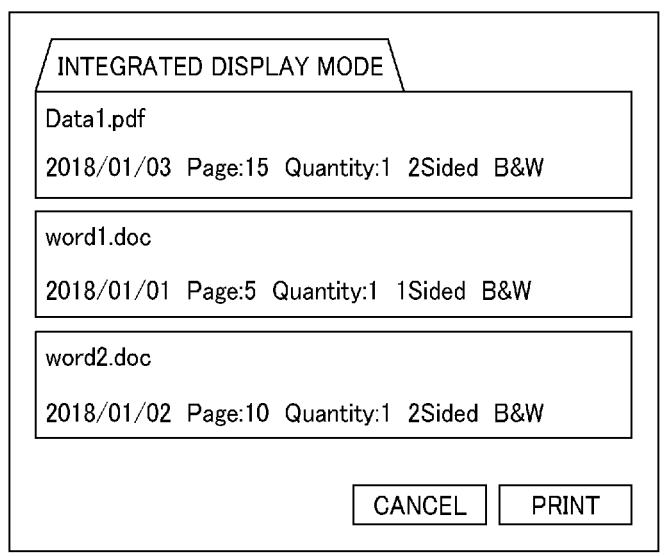
FIGS. 10A, 10B and 10C (FIG. 10) are example diagrams of job lists to be displayed on an operation panel provided for an MFP.
Figure 10B:
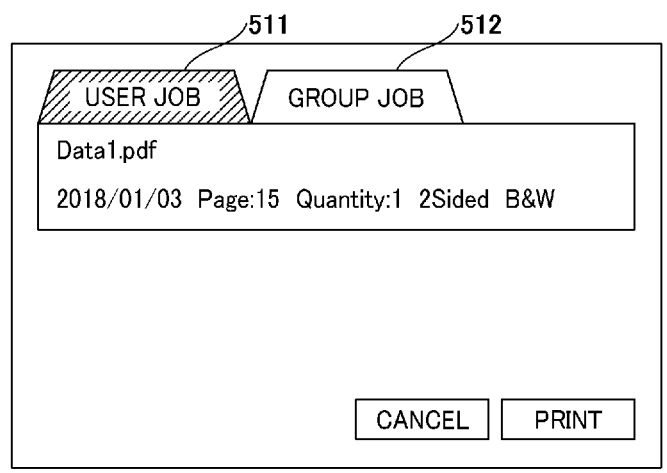
Figure 10C:
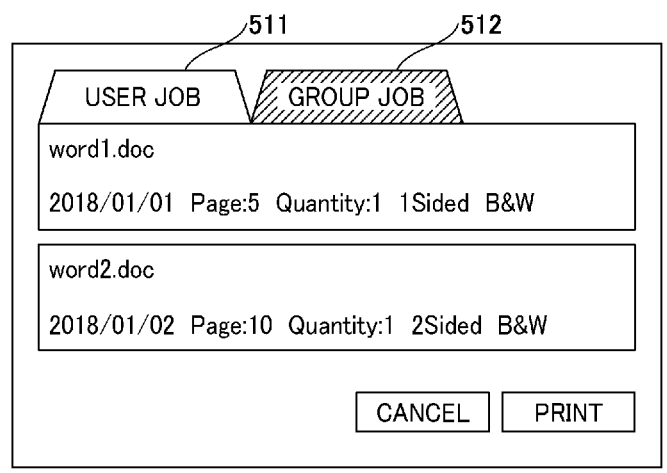

FIGS. 10A, 10B and 10C (FIG. 10) are examples of job lists to be displayed on the operation panel provided for the MFP 50. FIGS. 10A, 10B and 10C (FIG. 10) indicate one example case, in which user's own print job set by one user himself or herself, a print job assigned to one group to which one user belongs, and a print job assigned to another group set at a specific hierarchy level in the specific hierarchical group structure with respect to one group are displayed. FIG. 10A illustrates a display example of the job list when the display mode is set with the integrated display mode, and FIGS. 10B and 10C illustrate display examples of the job list when the display mode is not set with the integrated display mode (i.e., display mode is set with the nonintegrated display mode).

FIG. 10A illustrates an example case of the integrated display mode, in which the user's own print job, the print job assigned to one group to which the user belongs, and the print job assigned to another group (e.g., subordinate group) are merged and displayed collectively as the job list. If the number of print jobs displayed as the job list is relatively smaller as indicated in FIG. 10A, the user does not need to switch tabs, which is convenient for the user.

FIG. 10B illustrates an example case not using the integrated display mode (i.e., display mode is set with the non-integrated display mode), and a user job tag 511 is being in a selected state. Therefore, the user's own print job alone is displayed in the job list.

FIG. 10C illustrates another example case not using the integrated display mode (i.e., display mode is set with the non-integrated display mode), and a group job tag 512 is being in a selected state. In an example case in FIG. 10C, the print job assigned to one group to which the user belongs, and the print job assigned to another group (e.g., subordinate group) are displayed as the job list.

The display style illustrated in FIGS. 10B and 10C are convenient when the number of print jobs displayed in the job list becomes larger because the print job to be printed can be selected separately from the user's own print job, the print job assigned to the group to which the user belongs, and the print job assigned to another group (e.g., subordinate group).

(When Group Name is Changed)

Due to the reorganization, a user belonging to one group may be transferred to another group, or the group name itself may be changed. If one user belonging to one group is transferred to another group, the user-transfer information is reflected in the user information DB 76. However, the user-transfer information is not reflected to the group name assigned to the print job accumulated as the group printing before one user is transferred from one group to another group. However, even if one user belonging to one group is transferred to another group, one user himself or herself can print the print job registered by one user himself or herself. Further, even if one user belonging to one group is transferred to another group, other users still belonging to one group and other users belonging to another group (e.g., upper group) can still print the print job registered by one user now transferred to another group. Therefore, there is little trouble for the printing operation even if one user belonging to one group is transferred to another group.

By contrast, if the group name itself is changed (i.e., previous group name is changed to current group name), the group name stored in the user information DB 76 is also changed, but the print job accumulated in association with the previous group name (i.e., before changing the group name) may be still registered with the previous group name. If the group name itself is changed, the current group name (i.e., changed group name) differs from the previous group name stored in the print job information DB 77, in which users cannot print the print job assigned to the group printing. To avoid such situation, instead of associating the group name with the print job, it is effective to associate and register the group ID with the print job in the print job information DB 77, or associate and register both of the group ID and group name with the print job in the print job information DB 77.

In this configuration, it is assumed that the group name and the group ID are registered in the user information DB 76 and the group ID is not changed even if the group name itself is changed. Therefore, even if the group name itself is changed, the print job information DB 77 can be searched using the group ID, with which users can perform the printing operation of the print job associated with the previous group name.

Further, as another countermeasure in case of the group name itself is changed, a group name transfer database (DB) can be prepared.

FIG. 11 is an example of the group name transfer DB. The group name transfer DB can be stored in the print server 70 or on the network accessible from the print server 70.

As illustrated in FIG. 11, the group name transfer DB registers names of groups before changing the group names (i.e., previous group names) and names of groups after changing the group names (i.e., current group names) in association with each other. In response receiving the job list request or job acquisition request, the print server 70 searches the current group name (i.e., group name after changing the group name) to which the user belongs from the user information DB 76, and further searches the previous group name (i.e., group name before changing the group name) from the group name transfer DB. With this configuration, the print job associated with the previous group name can be acquired from the print job information DB 77.

As to the above described printing system 100 of the embodiment, since a print job can be transmitted to the MFP 50 based on the hierarchical structure of groups to which users belong, if one user registers the print job using a printer driver allocated to one group to which one user belongs (first group), another user who belongs to another group (second group), such as the upper group higher than one group, can print the print job registered by one user. In conventional group printing, the registration of print job is required for every one of the groups. By contrast, in the embodiment, the workload required for registering the print job can be reduced.

Further, the user can easily switch between the registration of the user's own print job and the registration of the print job assigned to the group printing by performing a simple operation, such as selecting the printer drivers (printer icons). Further, when the integrated display mode is set, the user's own print job, the print job assigned to one group to which one user belongs (first group), and the print job assigned to another group (second group), such as the subordinate group, can be merged and displayed collectively, and if the integrated display mode is not set, the user's own print job, the print job assigned to one group to which the user belongs, and the print job assigned to another group (second group), such as the subordinate group, can be displayed separately.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

For example, in the above described embodiment, the print server 70 accumulates print jobs, and the user's own print job, the print job assigned to one group to which one user belongs (first group), and the print job assigned to another group (second group), such as the subordinate group, are distributed to the MFP 50, but the MFP 50 can be configured to perform the accumulation processing. In this case, the MFP 50 can be configured to accumulate the print jobs in the MFP 50, and then the MFP 50 can be configured to use the user information DB 76, the print job information DB 77 and the group information DB 78.

Further, in this description, the group information extraction unit 72 is an example of a group identification information detection unit, the print job accumulation unit 73 is an example of a print job accumulation unit, the affiliation group identification unit 75 is an example of a print job providing unit and an identification unit, the print job information DB 77 is an example of a job storage or print job storage (e.g., memory), the user information DB 76 is an example of a user information storage (e.g., memory), the job list acquisition unit 52 is an example of an acquisition unit, the display control unit 57 is an example of a display unit, the job list merging unit 55 is an example of a merging unit, the integrated display mode setting retention unit 56 is an example of a setting retention unit, the group information DB 78 is an example of a group information storage (e.g., memory), and the second communication unit 71 is an example of a reception unit.

The above described embodiment can be configured as follows.

A print server includes a reception unit configured to receive job information of a print job transmitted from an information processing apparatus used by a first user via a network; a group identification information detection unit configured to detect group identification information identifying a group to which the first user belongs from the print job received by the reception unit; a print job accumulation unit configured to accumulate the group identification information detected by the group identification information detection unit in a print job storage in association with the print job; in response to receiving a job list request of print job transmitted from a second user via the network and based on identification information of the second user who has transmitted the job list request, a print job providing unit configured to identify a first group to which the second user belongs and a second group set at a specific hierarchy level in a specific hierarchical group structure with respect to the first group, and to provide a first print job associated with first identification information identifying the first group and a second print job associated with second identification information identifying the second group, to an image forming apparatus.

As to the print server, the group identification information detection unit detects the group identification information from a name of a printer driver included in the print job received by the reception unit.

As to the print server, when the group identification information detection unit cannot detect the group identification information from the name of the printer driver included in the print job received by the reception unit, the print job accumulation unit accumulates the print job in the print job storage in association with identification information of the first user who has transmitted the print job to the print server.

As to the print server, the print job providing unit refers to a user information storage storing identification information of one or more users associated with one or more group names, to identify the first group to which the second user belongs, the first group is associated with the identification information of the second user who has transmitted the job list request, and the print job providing unit refers to a group information storage storing information of the specific hierarchical group structure to identify a hierarchical level set for the second group with respect to the first group.

As to the print server, the print job providing unit identifies that the second group is set at a lower hierarchical level compared to the first group in the specific hierarchical group structure.

An image forming apparatus is communicable with a print server. The print server includes a reception unit configured to receive job information of a print job transmitted from an information processing apparatus used by a first user via a network; a group identification information detection unit configured to detect group identification information identifying a group to which the first user belongs from the print job received by the reception unit; a print job accumulation unit configured to accumulate the group identification information detected by the group identification information detection unit in a print job storage in association with the print job; in response to receiving a job list request of print job transmitted from a second user via the network and based on identification information of the second user who has transmitted the job list request, a print job providing unit configured to identify a first group to which the second user belongs and a second group set at a specific hierarchy level in a specific hierarchical group structure with respect to the first group, and to provide a first print job associated with first identification information identifying the first group and a second print job associated with second identification information identifying the second group, to the image forming apparatus. The image forming apparatus includes an acquisition unit configured to transmit the identification information of the second user to the print server to acquire one or more print jobs from the print server; and a display unit configured to display the one or more print jobs acquired by the acquisition unit on an operation panel.

As to the image forming apparatus, the acquisition unit includes a merging unit configured to acquire the one or more print jobs, acquired from the print server, and information indicating whether or not the group identification information is associated with the one or more print jobs in the print job storage, and to merge a print job associated with the group identification information and a print job not associated with the group identification information, and the display unit displays a plurality of print jobs merged by the merging unit on the operation panel.

The image forming apparatus further includes a setting retention unit configured to retain a setting indicating whether integrally displaying the print job associated with the group identification information and the print job not associated with the group identification information, and the merging unit merges the print job associated with the group identification information and the print job not associated with the group identification information when the setting retention unit sets the setting of integrally displaying the print job associated with the group identification information and the print job not associated with the group identification information, while the merging unit does not merge the print job associated with the group identification information and the print job not associated with the group identification information when the setting retention unit does not set the setting of integrally displaying the print job associated with the group identification information and the print job not associated with the group identification information, in which the display unit separately displays the print job associated with the group identification information and the print job not associated with the group identification information.

A recording medium such as a carrier medium or non-transitory computer readable storage medium storing one or more instructions that, when executed by one or more processors, cause the one or more processors to perform a method of communicating information between an information processing apparatus and a print server communicable with each other via a network. The method includes receiving job information of a print job transmitted from an information processing apparatus used by a first user via a network; detecting group identification information identifying a group to which the first user belongs from the received print job; accumulating the detected group identification information in a print job storage in association with the print job; in response to receiving a job list request of print job transmitted from a second user via the network and based on identification information of the second user who has transmitted the job list request, identifying a first group to which the second user belongs and a second group set at a specific hierarchy level in a specific hierarchical group structure with respect to the first group, and providing a first print job associated with first identification information identifying the first group and a second print job associated with second identification information identifying the second group, to an image forming apparatus.

A printing system includes a print server, and an image forming apparatus communicable with the print server via a network. The print server includes a reception unit configured to receive job information of a print job transmitted from an information processing apparatus used by a first user via a network; a group identification information detection unit configured to detect group identification information identifying a group to which the first user belongs from the print job received by the reception unit; a print job accumulation unit configured to accumulate the group identification information detected by the group identification information detection unit in a print job storage in association with the print job; in response to receiving a job list request of print job transmitted from a second user via the network and based on identification information of the second user who has transmitted the job list request, a print job providing unit configured to identify a first group to which the second user belongs and a second group set at a specific hierarchy level in a specific hierarchical group structure with respect to the first group, and to provide a first print job associated with first identification information identifying the first group and a second print job associated with second identification information identifying the second group, to the image forming apparatus. The image forming apparatus includes an acquisition unit configured to transmit the identification information of the second user to the print server to acquire a print job from the print server;

and a display unit configured to display the print job acquired by the acquisition unit on an operation panel.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium such as a recording medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific simultaneous circuit (ASIC), DSP (digital signal processor), FPGA (field programmable gate array) and conventional circuit components arranged to perform the recited functions.

This patent application is based on and claims priority pursuant to 35 U.S.C. § 119(a) to Japanese Patent Application No. 2018-127068, filed on Jul. 3, 2018 in the Japan Patent Office, the entire disclosure of which is hereby incorporated by reference herein.

REFERENCE SIGNS LIST

30 PC
50 MFP
70 Print Server
100 Printing System

The invention claimed is:

1. A print server connectable to an information processing apparatus and an image forming apparatus via a network, the print server comprising:
a receiver configured to receive one or more print jobs transmitted from the information processing apparatus via the network;
processing circuitry configured to
extract one or more group names to which one or more users belong, from the one or more print jobs received by the receiver,
accumulate the one or more group names extracted by the group information extraction unit in a job storage in association with the one or more print jobs,
identify, in response to receiving a job acquisition request of print job from the image forming apparatus and based on identification information of a specific user who has transmitted the job acquisition request, a primary group to which the specific user who has transmitted the job acquisition request belongs, and a secondary group set at a specific hierarchy level in a specific hierarchical group structure with respect to the primary group, and
prepare a job list relating to a primary print job associated with the identified primary group and a secondary print job associated with the identified secondary group, in accordance with the specific hierarchy level; and
a transmitter configured to transmit the job list to the image forming apparatus.

2. The print server according to claim 1,
wherein the processing circuitry is further configured to extract the one or more group names from names of one or more printer drivers included in the one or more print jobs received by the receiver.

3. The print server according to claim 2,
wherein when the processing circuitry cannot extract any of the one or more group names from the names of the one or more printer drivers included in the one or more print jobs received by the receiver, the processing circuitry is configured to accumulate the one or more print jobs in the job storage in association with identification information of the specific user who has transmitted the one or more print jobs using the information processing apparatus.

4. The print server according to claim 1,
wherein the processing circuitry is further configured to refer to a user information storage storing identification information of the one or more users associated with the one or more group names, to identify the primary group to which the specific user who has transmitted the job acquisition request belongs, the primary group being associated with identification information of the specific user who has transmitted the job acquisition request, and
wherein the processing circuitry is further configured to refer to a group information storage storing information of the specific hierarchical group structure to identify a hierarchical level set for the secondary group with respect to the primary group.

5. The print server according to claim 4,
wherein the processing circuitry is further configured to identify that the secondary group is set at a lower hierarchical level compared to the primary group in the specific hierarchical group structure.

6. An image forming apparatus connectable to an information processing apparatus via a network, the image forming apparatus comprising:
a receiver configured to receive one or more print jobs transmitted from the information processing apparatus via the network;
processing circuitry configured to
extract one or more group names to which one or more users belong, from the one or more print jobs received by the receiver,
accumulate the extracted one or more group names in a job storage in association with the one or more print jobs,
identify, in response to receiving a job acquisition request of print job and based on identification information of a specific user who has input the job acquisition request to the image forming apparatus, a primary group to which the specific user who has input the job acquisition request belongs, and a secondary group set at a specific hierarchy level in a specific hierarchical group structure with respect to the primary group, and acquire, from the job storage, a job list relating to a primary print job associated with the identified primary group, and a secondary print job associated with the identified secondary group, the job list being prepared in accordance with the specific hierarchy level; and a display to display the primary print job associated with the primary group and the secondary print job associated with the secondary group on an operation panel collectively or separately in accordance with the job list.

7. The image forming apparatus according to claim 6, wherein the processing circuitry is further configured to acquire, from the job storage, the primary print job associated with the primary group and the secondary print job associated with the secondary group, the processing circuitry being settable with an integrated display mode to merge the primary print job and the secondary print job, wherein when the processing circuitry is set with the integrated display mode, the display displays the primary print job and the secondary print job merged by the processing circuitry, on the operation panel, collectively.

8. The image forming apparatus according to claim 7, wherein the processing circuitry is settable with a non-integrated display mode not to merge the primary print job and the secondary print job, and wherein when the processing circuitry is set with the non-integrated display mode, the display displays the primary print job and the secondary print job on the operation panel, separately.

9. A method of controlling a printing operation using an image forming apparatus, the method comprising;

receiving one or more print jobs transmitted from an information processing apparatus via a network;

extracting one or more group names to which one or more users belong, from the received one or more print jobs;

accumulating the extracted one or more group names in a job storage in association with the one or more print jobs;

in response to receiving a job acquisition request of print job from the image forming apparatus and based on identification information of a specific user who has input the job acquisition request to the image forming apparatus, identifying a primary group to which the specific user who has input the job acquisition request belongs, and a secondary group set at a specific hierarchy level in a specific hierarchical group structure with respect to the primary group;

preparing a job list relating to a primary print job associated with the identified primary group and a secondary print job associated with the identified secondary group, in accordance with the specific hierarchy level; and transmitting the job list to the image forming apparatus.

* * * * *